United States Patent
Maggio et al.

(10) Patent No.: US 9,704,264 B2
(45) Date of Patent: Jul. 11, 2017

(54) METHOD FOR TRACKING A TARGET IN AN IMAGE SEQUENCE, TAKING THE DYNAMICS OF THE TARGET INTO CONSIDERATION

(71) Applicant: COMMISSARIAT A L'ENERGIE ATOMIQUE ET AUX ENERGIES ALTERNATIVES, Paris (FR)

(72) Inventors: Simona Maggio, Gif-sur-Yvette (FR); Bertrand Luvison, Gif-sur-Yvette (FR); Quoc Cuong Pham, Gif-sur-Yvette (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 0 days.

(21) Appl. No.: 14/773,211

(22) PCT Filed: Feb. 26, 2014

(86) PCT No.: PCT/EP2014/053671
§ 371 (c)(1),
(2) Date: Sep. 4, 2015

(87) PCT Pub. No.: WO2014/135404
PCT Pub. Date: Sep. 12, 2014

(65) Prior Publication Data
US 2016/0019700 A1 Jan. 21, 2016

(30) Foreign Application Priority Data
Mar. 5, 2013 (FR) ...................................... 13 51914

(51) Int. Cl.
*G06T 7/246* (2017.01)
*G06T 7/20* (2017.01)

(52) U.S. Cl.
CPC .............. *G06T 7/2033* (2013.01); *G06T 7/20* (2013.01); *G06T 7/246* (2017.01);
(Continued)

(58) Field of Classification Search
CPC ......... G06T 7/2033; G06T 7/246; G06T 7/20; G06T 2207/10016; G06T 2207/30196; G06T 2207/30232; G06T 2207/30241
(Continued)

(56) References Cited

U.S. PATENT DOCUMENTS
2008/0123900 A1* 5/2008 Ma .......................... G06K 9/32
382/103

FOREIGN PATENT DOCUMENTS
GB 2 452 512 A 3/2009

OTHER PUBLICATIONS
Brandon Bennett et al., "Enhanced tracking and recognition of moving objects by reasoning about spatio-temporal continuity," Science Direct, Image and Vision Computing, vol. 26, No. 1, 2007, pp. 67-81, XP022334789.
(Continued)

Primary Examiner — Amandeep Saini
(74) Attorney, Agent, or Firm — Baker & Hostetler LLP (57) ABSTRACT

A method for tracking a target in a sequence of images comprises: a step of detecting objects, a temporal association step, aiming to associate the objects detected in the current image with the objects detected in the previous image based on their respective positions, a step of determining a second target in the current image according to a search area determined for a previous image of the sequence, a step of determining the detected object that best corresponds to a dynamic of a final target, a step of updating the search area for the current image based on the position of the target that best corresponds to the dynamics of the final target, and a step of searching for the final target in the search area for the current image by comparing areas of the
(Continued)

current image with a reference model representative of the final target.

7 Claims, 3 Drawing Sheets

(52) U.S. Cl.
CPC .............. *G06T 2207/10016* (2013.01); *G06T 2207/30196* (2013.01); *G06T 2207/30232* (2013.01); *G06T 2207/30241* (2013.01)

(58) Field of Classification Search
USPC .......................................................... 382/103
See application file for complete search history.

(56) References Cited

OTHER PUBLICATIONS

Wang Jiangfeng et al., "Object Tracking and Primitive Event Detection by Spatio-Temporal Tracklet Association," 2009 Fifth International Conference on Image and Graphics, Sep. 20, 2009, pp. 457-462, XP031652776.

Weizhi Nie et al., "Multiple Person Tracking by Spationtemporal Tracklet Association," 2012 IEEE Ninth International Conference on Advanced Video and Signal-Based Surveillance, Sep. 18, 2012, pp. 481-486, XP032248270.

Kyanda Swaib Kaawaase et al., "A selective review on target tracking algorithms," International Conference on Graphic and Image Processing (SPIE), vol. 8285, No. 1, Oct. 11, 2011, pp. 1-10, XP060019193.

Alper Yilmaz et al., "Object Tracking: A Survey," ACM Computing Surveys, vol. 38, No. 4, Dec. 1, 2006, pp. 1-45, XP007902942.

Junliang Xing et al., "Multi-Object Tracking through Occlusions by Local Tracklets Filtering and Global Tracklets Association with Detection Responses," Computer Vision and Pattern Recognition, 2009, pp. 1200-1207.

Michael Isard et al., "Condensation—Conditional Density Propagation for Visual Tracking," International Journal of Computer Vision, vol. 29, No. 1, pp. 5-28, 1998.

\* cited by examiner

METHOD FOR TRACKING A TARGET IN AN IMAGE SEQUENCE, TAKING THE DYNAMICS OF THE TARGET INTO CONSIDERATION

CROSS-REFERENCE TO RELATED APPLICATIONS

This application is a National Stage of International patent application PCT/EP2014/053671, filed on Feb. 26, 2014, which claims priority to foreign French patent application No. FR 1351914, filed on Mar. 5, 2013, the disclosures of which are incorporated by reference in their entirety.

FIELD OF THE INVENTION

The invention relates to the field of video surveillance and, more particularly, to the field of real-time object tracking. It relates to a method for tracking a target in a sequence of images and is particularly applicable in high-traffic public environments.

BACKGROUND

With the development of video image processing means, the images from video surveillance are increasingly analyzed by a video processing algorithm. A video surveillance system can notably integrate an algorithm to track objects of interest, such as individuals, in a sequence of images. These objects of interest are called targets. An object tracking algorithm must deal with various constraints, and particularly with temporary target occlusions. These occlusions may be due to the stationary elements of the scene, in such a case, reference is made to environmental occlusion, or to mobile elements such as people, in which case reference is made to object occlusion. An occlusion can be partial, if the target remains partially visible, or total, if the target is completely invisible in the scene. For example, in the case of a partial occlusion of a person, the head and chest may remain visible, whereas the legs are hidden by another person closer to the camera. When significant occlusion occurs, the tracking algorithm cannot observe the target that it is supposed to track in the scene. This results in an error in the location of the target with generally increasingly spreads throughout the duration of the occlusion. This error may become irreversible if the tracking algorithm has difficulty distinguishing the target from other objects that hide it. The case can, for example, occur if the target is similar in appearance to that of other objects.

In a so-called "multi-target" tracking context, that is, when several objects of interest, or all the moving objects in the scene, are tracked simultaneously, the interactions between the objects can be modeled based on their movements, and thus it is possible to determine the occlusions present. For example, patent application GB 2 452 512 A (GB 07 17277) discloses a method for managing occlusions comprising a re-identification step. This re-identification does not necessarily take place as soon as the objects involved in the occlusion become separated. As long as the ambiguity due to the occlusion has not been resolved, the paths of all the objects involved in the occlusion are labeled with the identifiers. The ambiguity persists for a few images, until the various targets are identified once again. The path of each target can subsequently be retrieved by going back in time. Another solution for managing the tracking of objects in the presence of an occlusion is based on a global association, that is the simultaneous use of multiple target trajectories. Each trajectory consists of a sequence of track segments, called "tracklets". Global association techniques are very efficient, but at a high computational cost making them unsuitable for real-time tracking. The document by Junliang Xing, Haizhou Ai, Shihong Lao: "Multi-Object Tracking through Occlusions by Local Tracklets Filtering and Global Tracklets Association with Detection Responses", Computer Vision and Pattern Recognition, 2009, describes the use of a tracking algorithm by particle filtering supported by a global association method in a reduced temporal window. This solution makes it possible to maintain real-time processing and ensure overall optimization of object trajectories. The detection-based filter determines the optimal position of the targets, and therefore their track, and selects the most significant observations for each target. At the same time, the observations detected by a people classifier are associated image by image according to the affinity in the position, the size and appearance, by generating potential tracklets. These potential tracklets are associated with the tracks from the filter in order to maximize the final trajectories. This global association step is performed based on similarities in track size, appearance and dynamics. When a target can no longer be observed, due to an occlusion for example, the filter is stopped and the track can only be continued through global association with a potential detection-based tracklet. One limitation of this solution stems from absolute confidence in the filter. As long as the filter responds positively to its observation model, its result is not checked, the global association being used only to fill in any blanks in the trajectories provided by the filter.

The situation is more complex for so-called "single-target" tracking, where a single object of interest, a person for example, is tracked, although several other objects are moving in the scene. In this context, the observations of elements next to the target, which are not being tracked, are not allocated to objects. Thus, when the target is obscured, these observations can be wrongly attributed to the target. The same problem arises with multi-target tracking, when certain objects are not tracked. However, robust multi-target tracking in relation to occlusions and based on global association techniques may prove difficult in real time in a busy public location, such as a train station or an airport. Real-time tracking is particularly important when security officers must be informed of the location of a suspicious individual. An individual can notably become suspect when he/she enters a prohibited area, abandons a piece of luggage or assaults someone.

SUMMARY OF THE INVENTION

A purpose of the invention is notably to overcome all or part of the aforementioned drawbacks by providing a reliable method for tracking a single target or a limited number of targets in a sequence of images while enabling real-time processing. For this purpose, the invention is based on a global association technique combined with a visual target tracking algorithm based on visual signatures. Thus, the visual tracking algorithm display can compensate for the weaknesses of the detector, notably in the absence of detections, and the global association technique helps guide the tracking algorithm by providing it with information about the surrounding area. More specifically, the invention relates to a method for tracking a target in a sequence of images representing a scene, the method comprising, for each current image:

a step of detecting objects in the scene, each object detected being characterized by a position and a dimension in the current image, a temporal association step, in which an attempt is made to associate each object detected in the current image with an object detected in the previous image of the sequence according to their respective positions in the images, each set of objects detected in a continuous sequence of images forming a tracklet, one of the tracklets being assigned to a first target, a step of determining a second target in the current image, the detected object best corresponding to a given search area determined for a previous image of the sequence being assigned to the second target, a step of comparison between the identity of the detected object assigned to the first target and the identity of the detected object assigned to the second target, in the case of different identities, a step of determining the detected object that best corresponds to a dynamic of a final target, in the case where the first target best corresponds to the dynamics of the final target, a step of updating the search area for the current image based on the position of the first target, in the case where the second target best corresponds to the dynamics of the final target, a step of updating the search area for the current image based on the position of the second target, and a step of searching for the final target in the search area for the current image by comparing areas of the current image with a reference model representative of the final target.

According to a particular embodiment, the method according to the invention further comprises, in the case where the detected object assigned to the first target is the same as that assigned to the second target, a step of updating the search area for the current image based on the position of the first and the second target.

According to a particular embodiment, the method according to the invention further comprises, following a temporal association step, a step for extending the tracklet of the first target when said tracklet was not supplemented by an object detected in the current image, the tracklet of the first target being supplemented by a virtual observation according to the dynamics of a final target.

According to a particular embodiment, the method according to the invention further comprises, in the case where no detected object has been assigned to the second target:

a step wherein it is determined if the detected object in the current image associated with the first target is consistent with the dynamics of the final target, and in case of compatibility, a step of updating the search area for the current image based on the position of the first target.

According to a particular embodiment, the method according to the invention further comprises, in the case where no detected object has been assigned to the first target:

a step wherein it is determined if the detected object assigned to the second target does not belong to a tracklet other than that of the target, and in the case where this detected object does not belong to a tracklet other than that of the target, a step of updating the search area for the current image based on the position of the second target.

According to a particular variant of the method according to the invention, the step of updating the search area based on the position of the second target further comprises a correction of the tracklet of the first target, the detected object assigned to the first target being substituted by the detected object assigned to the second target.

The invention notably has the advantage of being able to confirm or correct the position of the target according to its dynamics.

BRIEF DESCRIPTION OF THE DRAWINGS

The invention will be better understood and other advantages will become apparent on reading the description which will follow, made with reference to the accompanying drawings wherein.

DETAILED DESCRIPTION

The invention concerns a method for tracking a target in a sequence of digital video images representing a monitored scene, for example a train station or airport concourse. The sequence of video images is also called a video stream. For the remainder of the description, single-target tracking is considered, i.e. tracking of a single target at a time. The tracking process may however be adapted to multi-target tracking with a limited number of targets, i.e. tracking of a number of targets lower than the number of objects in the scene. Similarly, the invention is described considering a video stream from a single source. However, the invention could also be adapted to process video streams from several sources. A source generally comprises a video camera. The video camera can be stationary or motorized. A motorized camera is also referred to as a "Pan-Tilt-Zoom" (PTZ) camera. This type of camera allows video images to be focused on a specific area of the scene monitored.

Figure 1:
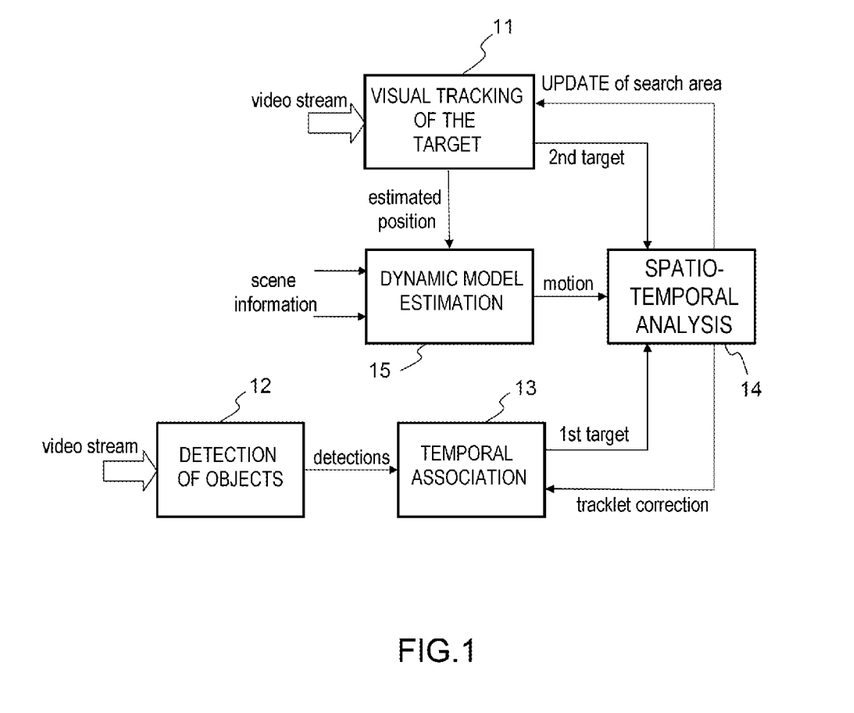
FIG. 1 represents an example for implementing the tracking method according to the invention.

The diagram in FIG. 1 represents an example of how the tracking method according to the invention is implemented. The device 10 comprises a visual tracking module 11, an object detection module 12, a temporal association module 13 and a spatio-temporal module 14 for analyzing relationships between a target and its surrounding area. In addition, the device 10 can comprise a module 15 for estimating the dynamics of a tracked target. The visual tracking module 11 and the object detection module 12 each receive the same video stream. The object detection module 12 is designed to detect a set of objects of interest among which the target may be found. The temporal association module 13 processes the data of the object detection module 12 in order to establish links between the various objects of interest detected in the sequence of images. More specifically, the module 13 is designed to associate each object of interest detected in an image with another object of interest detected in the previous images of the sequence. Insofar as one of the objects of interest is supposed to be the target, the temporal association module 13 estimates the position of the target. It is said that the temporal association module 13 offers an initial opinion about the detection of the target. For the remainder of the description, the "target of the temporal association" or "first target" designates the target estimated by the temporal association module 13, i.e. the object of interest detected in the current image that is associated with the target. Furthermore, the visual tracking module 11 determines, among the objects of interest detected by the object detection module 12, the one that best corresponds to a search area. This object of interest is referred to as the "visual tracking target", or "second target". It is said that the visual tracking module 11 offers a second opinion about the detection of the target. The spatio-temporal analysis module 14 then analyzes if the first and second targets are identical. If the temporal association module 13 and the visual tracking module 11 are in disagreement, the module 14 arbitrates according to a dynamic model of the target provided by the dynamic estimation module 15. The position of the target (first or second) that best corresponds to the dynamics of the target is used to update the search area. This search area, defined for a current image, is used in two ways for the next image in the sequence. As stated previously, the search area is initially used to determine the second target among objects of interest detected by the object detection module 12. Moreover, the search area is used by the visual tracking module 11 as an area wherein the target must be searched. The target thus detected is considered as the result of the tracking method for the current image. It is called the "final target". It should be noted that the detection of the final target is independent of the detections obtained by the object detection module 12. In other words, the final target does not necessarily correspond to one of the objects of interest detected.

The various modules of the video surveillance system 10 of the invention can be implemented in software and/or hardware form. The various modules can notably be implemented by a processor and a memory. The processor may be a general-purpose processor, a specific processor, an ASIC (Application-Specific Integrated Circuit) or an FPGA (Field-Programmable Gate Array).

Figure 2:
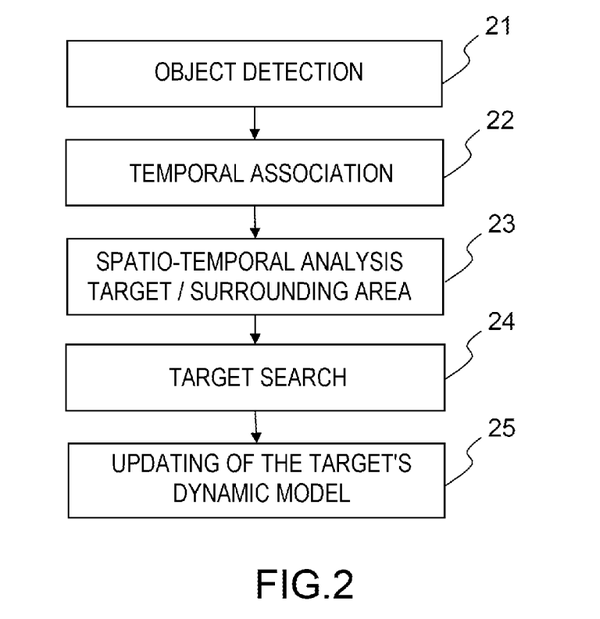
FIG. 2 represents an example of the steps of the tracking method according to the invention.

The operation of the method according to the invention is described in further detail below. FIG. 2 represents an example of the steps of the target tracking method according to the invention. The method successively comprises, for each image of the sequence, a step 21 of detecting objects in the scene, a temporal association step 22, a step 23 of spatio-temporal analysis of the relationships between the target and its surrounding area, and a target search step 24. The method may also include a step 25 of updating a dynamic model of the target.

The object detection step 21 consists in detecting a set of objects of interest in the current image of the sequence. The term "object of interest" designates an object having at least one visual characteristic in common with the desired target. All objects having this characteristic form an object class. For example, objects of interest may have a shape or a color similar to that of the target. Thus, the target must normally be detected among the objects of interest. The detection, in itself, thus does not allow the target to be distinguished from other objects of interest. The target, among the objects of interest, is normally identified once for the entire sequence of images. The target is, for example, designated manually by an operator or by means of the visual tracking module 11. In the latter case, the detected object located closest to the target, estimated by the visual tracking module 11, is identified as the target. This target is referred to as the "first target". Naturally, the detection step 21 may not be fully reliable. It can produce false positives, i.e. detect objects that do not belong to the desired class, as well as false negatives, i.e. miss detecting objects present in the scene which belong to the desired class. False negatives are very frequent during occlusion periods, even if the target is only partially covered. Step 21 is performed by the object detection module 12. The detected objects are normally associated with a position and a dimension in the image. A detected object can be modeled by a frame surrounding this object. The position and dimension (width and height) of this frame in the image thus characterize the detected object. Objects may be detected in various ways, for example by means of a background subtraction processing or through classification processing. It is also possible to combine several types of detection. Furthermore, the detection step 21 can be guided based on the detection of the target in the previous image of the sequence. In this case, the detection of objects of interest may be limited to the surrounding area of the target. The surrounding area of the target in the image refers to all positions in the image for which an object, of interest or not, placed in that position, may result in at least partial occlusion of the target. It is possible to determine the surrounding area of a target by taking three-dimensional information of the scene into account, for example.

The temporal association step 22 consists in attempting to associate each object detected in the current image with an object detected in the previous image. In the interest of simplification, the objects detected in the current image are also referred to as "current detections", and the objects detected in the previous image, "previous detections". The association attempt is made based on known association criteria. Of course, one of the association criteria may relate to the current detections and previous positions. Other association criteria may relate to the respective dimensions of detections, or to the degree of overlap between a previous detection and a current detection. According to a particular embodiment, each detection is represented by a "position-dimensions" pair, and the association criteria refer to the distance and the degree overlap between each previous detection and each current detection. The association between a previous detection and a current detection can fail if, for example, the minimum distance between two detections is above a threshold distance, and/or if the degree of overlap is below a threshold level. The temporal association step 22 may notably be based on a Hungarian algorithm, also referred to as the "Kuhn-Munkres algorithm", wherein the cost c assigned to each association combines the distance d and the degree of overlap tc, according to the following expression:

$$c=(1-\sqrt{tc})(1-\exp(-\lambda \cdot d^2))$$

The term "association attempt" is used for step 22 insofar as the association of a current detection and a previous detection can fail if the chosen association criteria are not met for any of the possible pairs. The number of detections can vary from one image to another due to errors in the detection step 21 (false positives and false negatives) or simply due to a change in the number of objects of interest present in the images or in processed areas of the images. Consequently, there may be current detections without association as well as association interruptions. In any case, the result of the association must correspond to a maximum of one previous detection to each current detection, and a maximum of one current detection to each previous detection. A set of detections associated without interruption in a series of images is called a "detection track" or "tracklet". The set consisting of the object of interest identified as the primary target is referred to as the "target tracklet". A new tracklet is created for each current detection that has not been associated with a previous detection, and therefore with an existing tracklet. The current detection thus forms a tracklet head. On the contrary, when no current detection has been associated with an existing tracklet, the tracklet is either interrupted or supplemented with a so-called virtual observation of the corresponding object of interest. The supplementing of a tracklet is explained later.

Figure 3:
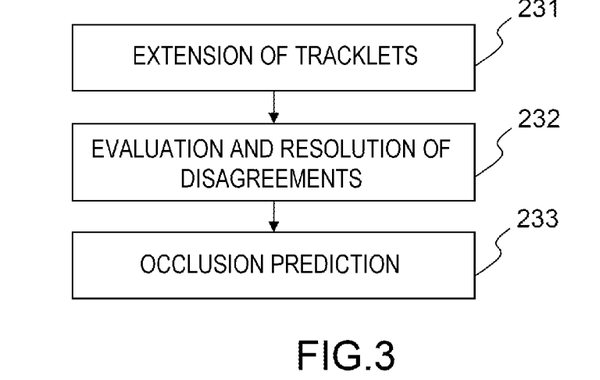
FIG. 3 represents an example of the sub-steps of a spatio-temporal analysis step.

Step 23 involving the spatio-temporal analysis of the relationships between the target and its surrounding area includes an analysis and the management of possible situations of disagreement between the opinion issued by the temporal association module 13, i.e. of the first target, and the opinion issued by the visual tracking module 11, i.e. of the second target. FIG. 3 represents an example of the sub-steps of the spatio-temporal analysis step 23. Step 23 comprises a first tracklet extension sub-step 231 and a sub-step 232 for evaluating and resolving a possible disagreement between the temporal association module 13 and the visual tracking module 11. It can also comprise a sub-step 233 for predicting occlusions of the target by other objects of interest.

As stated previously, during the temporal association step 22, it may occur that no current detection can be associated with a previous detection. The tracklet comprising the previous detection is then not extended for the current image. The tracklet extension step 231 consists in completing the tracklets with which no current detection was associated through virtual observations. The extension is preferably performed at least for the target tracklet. However, it can be performed for all tracklets. The tracklets are advantageously completed depending on the dynamics of the object of interest forming the tracklet. The target tracklet can be specified by moving the previous detection to a position determined based on the two-dimensional or three-dimensional speed of the target and the time between two images in the sequence. The dynamics of the target, in this case its speed, can be estimated by the dynamics estimation module 15. This module can determine the dynamics of the target by analyzing its movements in a given temporal window, for example on the last five or ten images of the sequence. The dynamics of the target could also be estimated based on data from other devices, such as distance sensors and/or speed sensors, or based on statistical data according to the type of target. The tracklet of a neighbor of the target can be supplemented in a manner similar to that of the target. For example, it is possible to generate a virtual observation for a neighbor considering an average speed of this neighbor on the last five frames of the sequence. Each tracklet may be supplemented by successive virtual observations. However, as the uncertainty about the position of the object of interest increases over time, it is possible to discontinue the tracklet in the event of an object of interest no longer being detected after a given number of images.

The sub-step 232 for evaluating and resolving a possible disagreement between the temporal association module 13 and the visual tracking module 11 firstly comprises determination of the second target, i.e. a determination, among the objects of interest detected by the object detection module 12, of that which best corresponds to the search area defined for the current image. The second target may, for example, correspond to the detection located at the shortest distance from the center of the search area. Then, the spatio-temporal analysis module 14 evaluates if the first and second target are identical, i.e. if they correspond to the same object of interest detected. If they do not, it means that there is disagreement. The module 14 is then responsible for resolving it in accordance with the dynamics of the target. It should be noted that both the determination of the first target and the second target may fail. No current detection or, as the case may be, no virtual observation, may have been associated with the target tracklet, and the search area may not contain an object of interest.

Figure 4:
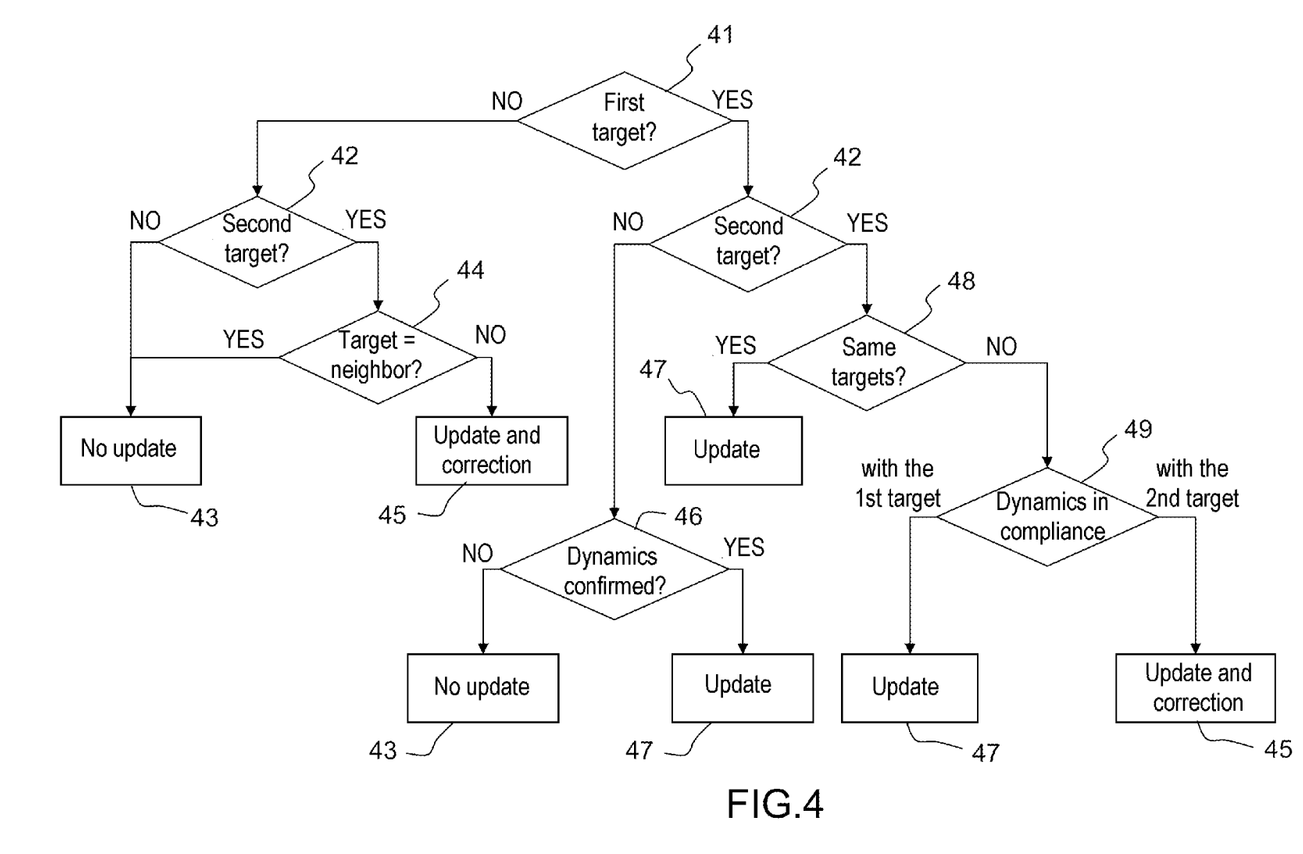
FIG. 4 illustrates the various detection situations that may occur, and an example of the processing to be carried out in each of these situations.

FIG. 4 illustrates the various possible detection situations, and an example of the processing to be carried out in each situation. In steps 41 and 42, it is determined if a first and a second target have been detected for the current image. In the case where no object of interest has been attributed to both the first target and the second target, no information about the position of the final target is available. Thus, in a step 43, the sub-step 232 for evaluating and resolving a possible disagreement is ended. The search area is thus not updated. In the case where no object of interest has been associated with the first target, but a second target has been determined, a step 44 determines whether or not the second target corresponds to one of the neighboring objects of interest, i.e. a current detection associated with a neighboring tracklet. If the second target actually belongs to a neighboring tracklet, it is terminated in sub-step 232 in step 43 without updating the search area. In place of sub-step 232, the search area can be modified by excluding the area adjacent to the second target. If the second target does not belong to a neighbor tracklet, this is because it is a new object of interest for which no tracklet has yet been formed. Thus, in a step 45, the second target is associated with the target tracklet, and the search area is updated based on the position of this second target. In the case where only a first target was determined, a step 46 is used to determine if the first target is consistent with the dynamics of the target. For example, the deviation between the speed of the target tracklet (ending with the first target), estimated on the last ten images, and the direction of movement of the target, estimated by the module 15, can be used as a test criterion. If this deviation is less than a predefined threshold, e.g. 30 degrees, the first target is considered to be consistent with the dynamics of the target. If this is not the case, the first target is not taken into account for the remainder of the process and it is terminated at sub-step 232 in step 43 without updating the search area. If, however, the first target is consistent with the dynamics of the target, in step 47, the search area is updated for the current image based on the position of the first target. In the case where both a first target and a second target were determined, a step 48 is used to determine if these targets are identical, i.e. if the same object of interest has been associated with each of the targets. If this is the case, then the search area is updated based on the position of the targets in step 47. If the first and second target are not identical, the spatio-temporal analysis module 14 must resolve the instance of disagreement and determine if it is more likely that the real target is the first target or the second target. Thus, in a step 49, it is determined if the target more consistent with the dynamics of the target is the first or the second target. This step 49 can, for example, be performed by comparing the directions taken by the first and by the second target relative to a direction of the target estimated by the dynamics estimation module 15. The direction taken by the first target is estimated based on its position in a previous image in the sequence and its position in the current image. Similarly, the direction taken by the second target is estimated based on its position in the same previous image and that in the current image. The dynamics of the target are preferably determined based on the positions of the final target. Thus, the direction of the target estimated by the module 15 can be estimated based on its position in a previous image of the sequence, and that in the current image. For example, the different directions taken since the last five images of the sequence are considered. In the case where it is the first target that is most consistent with the dynamics of the target, the search area is updated in the step 47 based on the position of the first target. In the case where it is the second target that is most consistent with the dynamics of the target, the search area is updated in the step 45 based on the position of the second target. In addition, in step 45, the target tracklet is corrected with the second target. More precisely, the current detection of the target tracklet is substituted by the second target.

The sub-step 233 for predicting occlusions of the target by other objects of interest is optional. It consists in determining if the neighboring objects of interest of the first target and/or second target can at least partially mask the target in the next images of a predefined time window of the sequence. This sub-step is performed based on tracklets of the neighbors and an estimate of their dynamics. When such a prediction is made, the updating of the search area in step 45 or 47 and/or step 24 of the target search can differ depending on whether or not an occlusion is possible. In particular, the focus of the search area can be more intense if an occlusion is possible. In particular, if partial occlusion of the target is predicted, where most of the object is visible, the search area is focused around the detection selected by sub-step 232 (first or second target), but with a rather large search radius. In this situation, the module 11 is not strongly penalized and remains reliable, and therefore its search area can remain quite extensive, as in regular tracking. On the contrary, a strong predicted occlusion requires that the search area be narrowed. The duration of the occlusion must also be considered in order to reduce the intensity of the focus on the search area, since a long duration implies greater uncertainty on the position of the hidden target. According to a particular embodiment, the radius of the search area varies, with an initial value dependent on the predicted degree of occlusion and growing with the duration of the occlusion to a maximum value.

The target search step 24 consists in searching for the position of the target in the search zone, updated or not. This target is qualified as "final". The target search is performed by the visual tracking module 11 by comparing different areas of the current image covering the search area with a reference model representative of the target. Any reference model can be used, such as a geometric model (rectangle, ellipse, etc.) wherein visual signatures, such as color or texture histograms characterizing the pixels in the model, can be calculated. For example, the target search can be based on a method using a "Sequential Importance Resampling" (SIR) particle filter, described for example in the document written by Michael Isard and Andrew Blake: "Condensation—conditional density propagation for visual tracking", International Journal of Computer Vision, 1998. In this method, the search area is explored by firing particles, representing hypothetical target positions, according to a law of probability, and privileging the particles of maximum likelihood based on a visual appearance criterion. The law of probability may be a Gaussian distribution centered on a position. When step 24 of the target search depends on whether or not an occlusion is considered possible in sub-step 233, the search area may be updated by establishing a terminal to draw particles around the target retained (first or second target). Each particle is fired a fixed number of times, retaining only the particles which fall in the search area. This helps promote the presence of particles in the terminal, but without directly changing the law of proposition of the particles, or their distribution.

The updating step 25 of the dynamic model of the target consists in updating the dynamic model of the target based on the last final target determined in step 24.

The invention claimed is:

1. A method of tracking a target in a sequence of images representing a scene, the method comprising, for each current image:
   detecting objects in the scene, each object detected being characterized by a position and a dimension in the current image,
   a temporal association, in which an attempt is made to associate each object detected in the current image with an object detected in a previous image of the sequence as claimed in their respective positions in the images, each set of objects detected in a continuous sequence of images forming a tracklet, one of the tracklets being assigned to a first target,
   determining a second target in the current image, the detected object best corresponding to a given search area determined for a previous image of the sequence being assigned to the second target,
   comparing between an identity of the detected object assigned to the first target and an identity of the detected object assigned to the second target,
   if different identities, determining the detected object that best corresponds to a dynamic of a final target,
   if the first target best corresponds to the dynamics of the final target, updating the search area for the current image based on a position of the first target,
   if the second target best corresponds to the dynamics of the final target, updating the search area for the current image based on a position of the second target, and
   searching for the final target in the search area for the current image by comparing areas of the current image with a reference model representative of the final target.

2. The method of claim 1, further comprising, in the case where the detected object assigned to the first target is the same as that assigned to the second target, updating the search area for the current image based on the position of the first and the second target.

3. The method of claim 1, further comprising, following a temporal association extending the tracklet of the first target when said tracklet was not supplemented by an object detected in the current image, the tracklet of the first target being supplemented by a virtual observation as claimed in the dynamics of a final target.

4. The method of claim 1, comprising, in the case where no detected object has been assigned to the second target:
   determining if the object detected in the current image associated with the first target is consistent with the dynamics of the final target, and
   in case of compatibility, updating the search area for the current image based on the position of the first target.

5. The method of claim 1, comprising, in the case where no detected object has been assigned to the first target:
   determining if the detected object assigned to the second target does not belong to a tracklet other than that of the target, and
   in the case where this detected object does not belong to a tracklet other than that of the target, updating the search area for the current image based on the position of the second target.

6. The method of claim 1, wherein updating the search area based on the position of the second target further comprises a correction of the tracklet of the first target, the detected object assigned to the first target being substituted by the detected object assigned to the second target.

7. A video surveillance system, comprising a processor and a memory configured to implement a method of tracking a target in a sequence of images representing a scene, the method comprising, for each current image:
- detecting objects in the scene, each object detected being characterized by a position and a dimension in the current image,
- a temporal association, in which an attempt is made to associate each object detected in the current image with an object detected in a previous image of the sequence as claimed in their respective positions in the images, each set of objects detected in a continuous sequence of images forming a tracklet, one of the tracklets being assigned to a first target,
- determining a second target in the current image, the detected object best corresponding to a given search area determined for a previous image of the sequence being assigned to the second target,
- comparing between an identity of the detected object assigned to the first target and an identity of the detected object assigned to the second target,
- if different identities, determining the detected object that best corresponds to a dynamic of a final target,
- if the first target best corresponds to the dynamics of the final target, updating the search area for the current image based on a position of the first target,
- if the second target best corresponds to the dynamics of the final target, updating the search area for the current image based on a position of the second target, and
- searching for the final target in the search area for the current image by comparing areas of the current image with a reference model representative of the final target.

* * * * *